Patented Jan. 31, 1950

2,496,244

UNITED STATES PATENT OFFICE 2,496,244

ION EXCHANGE SUGAR PURIFICATION

Fred L. Gayle, Lake Charles, La., assignor to American Cyanamid Company, New York, N. Y., a corporation of Maine No Drawing. Application October 12, 1946, Serial No. 702,894

6 Claims. (Cl. 127—46)

This invention relates to the purification of aqueous solutions of sugar, including sugar juices and sugar syrups.

Various methods of purifying sugar by means of ion exchange materials have been proposed. One method is to defecate a sugar juice, and then treat the juice with a cation exchange material and with an anion exchange material, with or without the use of carbon in the form of charcoal or bone char. This method is not satisfactory with respect to color removal, and after the juice has been treated in this manner, a certain undesirable amount of turbidity is found in the concentrated syrup after evaporation. The presence of coloring matter and turbidity limits the production of white sugar and necessitates a considerable amount of re-melting in order to complete the refining process.

Another method of utilizing ion exchange materials in the purification of sugar juices involves the separation of suspended material in the raw juice without defecation, followed by treatment of the raw juice with a series of pairs of ion exchangers, the first of each pair being a cation exchanger, and the other being an anion exchanger. This method of purification gives excellent ash removal, and it also removes a very large proportion of all of the non-sugars present. It has the disadvantage, however, that the treated juice after concentration in the evaporator is sometimes somewhat turbid and may contain some greenish-brown coloring matter. This again limits the amount and quality of white sugar which can be produced without a large amount of re-melting. Furthermore, if an attempt is made to remove the coloring matter or turbidity by means of carbon followed by filtration, the amount of carbon necessary is so large as to be uneconomical, and in addition, the results are not completely satisfactory since there is very little color removal even though the turbidity is removed.

Thus, both methods of using ion exchange materials for purifying sugar juices may result in sugar solutions which contain sufficient coloring matter and sufficient turbidity to be undesirable for the manufacture of white sugar without re-melting a considerable amount of the product.

An object of the present invention is to provide a method for removing coloring matter and turbidity from an aqueous solution of sugar which has been treated by means of ion exchange materials.

Another object of the present invention is to provide a method for the manufacture of white sugar wherein ion exchange materials are employed, and wherein the necessity for re-melting is completely removed or substantially reduced.

Still another object of the present invention is to produce a substantially clear and substantially colorless sugar solution from such a solution which has been treated with ion exchange materials, and which contains a small proportion of coloring matter.

These and other objects are attained by defecating an aqueous solution of sugar which has been treated by means of ion exchange materials with about 0.01%–0.1% of phosphoric acid, and thereafter adjusting the pH by means of lime to about 6–8, and preferably to about 7. When my process is applied to the purification of sugar juices which have been treated by means of ion exchange materials, or when it is applied to the treatment of sugar syrups which are concentrated from juices treated with ion exchange materials it is preferable that at least 50% of the non-sugar solids be removed from the sugar juice by means of the ion exchange materials before the defecation process. After the phosphoric acid and the lime are added to the solution to be purified, the latter may be clarified by any of the conventional methods. Thus, for example. if the juice is treated with ion exchange materials and concentrated to a syrup, the syrup is withdrawn from the evaporator, and the phosphoric acid and the lime are incorporated into the syrup. This may be conveniently done by agitation in a tank after which the syrup is aerated and then fed into a Williamson clarifier, where the impurities rise to the top and the scum is carried off over a roll, while the clear syrup is drawn off the bottom. The same procedure may be followed if the juice is to be treated before concentration, but instead of the Williamson clarifier, it is preferable that other clarifiers of the type normally used in the sugar factories be used, such as, for example, the Dorr clarifier or the Graver clarifier. The clarification may also be carried out by conventional means of filtration after the treatment of the solution with phosphoric acid and lime.

The following examples in which the proportions are in parts by weight, except when otherwise indicated, are given by way of illustration and not in limitation.

EXAMPLE 1

A raw sugar cane juice having the analysis shown in Table I is passed through an ion exchange purification system comprising a series of three pairs of beds, the first of each pair being a cation exchanger and the other being an anion exchanger. The treated juice has the analysis shown in Table I, and the non-sugar removal is 94.7%.

*Table I*

|  | Raw Juice | Treated Juice |
|---|---|---|
| Brix (percent solids on juice) | 16.66 | 10.33 |
| Glucose (percent on solution) | 0.73 | 0.82 |
| True Purity (percent on solids) | 84.63 | 91.48 |
| Potassium (percent solids as $CaCO_3$ on juice) | 0.19 | 0.00 |
| Ca and Mg (percent solids as $CaCO_3$ on juice) | 0.16 | 0.00 |
| Total Non-Sugars (percent on solids) | 11 | 0.58 |

The treated juice obtained in accordance with the foregoing description has a light, greenish-brown color, and is somewhat turbid. It is placed in a tank, and 0.02% of phosphoric acid, calculated on the basis of the available $P_2O_5$, and based upon the weight of solids in the juice, is added in the form of an aqueous solution containing 10–20% of ortho phosphoric acid. The juice is agitated, as for example, by means of a stirrer, and milk of lime (e. g. about 10 Baumé) is added to bring the pH to about 7.3–7.4. The juice is heated at about 185–215° F. to bring about coagulation, and then it is run into a settling tank or clarifier. Subsequently, the mud (coagulated impurities) may be drawn off and filtered. The juice is drawn off from the settling tank or clarifier, and it may also be filtered if desired. After this treatment, the juice has a pH of about 7, and it is then fed into an evaporator, and after concentration to about 55–65 Brix, the resulting syrup is withdrawn from the evaporator, mixed with 0.02% of a decolorizing vegetable carbon (Suchar) if desired, to remove color which may have developed during evaporation. There is also added a small quantity of a filter aid, and the syrup is then filtered in a conventional plate and frame press. The sugar syrup is clear and substantially colorless, and is suitable for use as such, or it may be used for the crystallization of white sugar in accordance with the conventional practice in a sugar pan. The sugar produced is of excellent quality, having a clear white color. Most of the sugar produced from a syrup prepared in the manner described above is of such fine quality that re-melting is not necessary. Thus, three or four strikes of high quality white sugar, not requiring re-melting, may be obtained. In other words, the amount of sugar requiring re-melting will not be over about 15%. The final molasses is of such fine quality that it may be used as a table syrup, for cooking or for blending purposes.

EXAMPLE 2

A treated juice is prepared in accordance with Example 1. This juice is optionally filtered, and then evaporated to about 60 Brix. The syrup is then drawn from the evaporator into a tank provided with an agitator and about 0.02% of phosphoric acid (calculated as available $P_2O_5$ and based upon the solids content of the syrup) is added in the form of a 10% aqueous solution of ortho phosphoric acid. Milk of life (e. g. 10 Baumé) is added to bring the pH to about 7.3 or such value as will give a neutral syrup after separation of the coagulated materials. The syrup is thoroughly agitated and aerated by agitation with compressed air, and then fed into the bottom of a Williamson-type clarifier. The clear syrup is heated in the clarifier to a temperature of 185–210° F., and when drawn off, it is a substantially water-white, clear syrup. Prior to treatment, the syrup is of a murky, greenish-brown color, and cannot be satisfactorily decolorized by means of carbon. The scum from the Williamson clarifier is filtered, as for example, in a plate and frame press, and the syrup so obtained is also of high quality. The syrup which is drawn from the clarifier may be filtered with or without carbon treatment, if under some circumstances there is any turbidity or color remaining. Generally, the syrup will be so well purified that it can be directly charged into the sugar pans, and the white sugar may be crystallized therefrom. The white sugar is of excellent quality. Most of the sugar produced from a syrup prepared in the manner described above is of such fine quality that re-melting is not necessary, as pointed out in Example 1.

The phosphoric acid may be added in accordance with my invention in any desired form, but preferably as a dilute aqueous solution containing about 2–20% of phosphoric acid. The lime may be added in any desired manner, but it is preferable that it be added as milk of lime, and this may contain from 1 to 20% or more of lime.

Purification of the sugar juice or sugar syrup by means of ion exchange materials may be accomplished by means of a system comprising from one to four pairs of ion exchangers, the first of which is a cation exchanger and the second of which is an anion exchanger. The ion exchange purification system preferably contains a plurality of pairs of ion exchangers, and if desired, the system may include a preliminary anion exchanger. It is preferable that the ion exchange purification system be operated so as to remove at least 50% of the non-sugar solids. My invention is directed particularly to the treatment of sugar juices which have been purified by ion exchange so that the resulting solution contains no more than about 0.1% ash. Insofar as it is economically feasible, it is desirable that the sugar syrup or solution be purified as much as possible by means of the ion exchange purification system.

My invention is adapted to the purification of either thin or concentrated sugar solutions. Generally, it is preferable to apply my invention to the more concentrated solutions, i. e., those having a solids content of at least 50 Brix, inasmuch as there is less volume of material to handle, and inasmuch as any impurities, such as iron, which may be picked up in the evaporator may be partly or entirely removed upon treatment with the phosphoric acid and lime.

Carbon to remove color is preferably added to the juice or syrup after treatment with the phosphoric acid and lime, and here again, it is desirable that the carbon be added to the syrup. In this way, the highest quality syrup is obtained which results in a higher yield of white sugar, or results in an extremely high-quality syrup. The prior treatment with the phosphoric acid and lime enables me to use much less carbon than would otherwise be required. In addition, color is removed which is not removed when the treatment with phosphoric acid and lime is omitted. Thus, from about 0.05% to about 0.5% of carbon, based on the solids in the liquid to be treated, is generally sufficient. As indicated in the above examples, the optimum proportion of carbon appears to be about 0.2%, although this varies somewhat with different types of carbon. I prefer to use vegetable carbons, but any type of decolorizing carbon may be used if desired, including bone char.

The present process may be used in the purification of any aqueous sugar solution which has been treated by ion exchange materials, such as molasses, affination liquors, solutions of raw (unrefined) sugar, etc. The process may be applied to sugar solutions obtained, not only from sugar cane, but also from sugar beets or sorghum cane, fruit juices, including grapefruit juice, pineapple juice, apple juice, etc. Other sugar solutions which may be purified in accordance with the present invention are those containing maltose, dextrose, fructose, glucose, maple sugar, invert sugar, etc.

I claim:

1. A process which comprises passing a raw sugar juice containing ionic impurities through at least one pair of ion exchange materials, the first of each pair being a cation exchanger and the other an anion exchanger, adding about 0.01–0.1% of phosphoric acid, calculated on the basis of the available $P_2O_5$ and based upon the weight of solids in the juice, thereafter adjusting the pH by means of lime to about 6–8 and removing the precipitated and coagulated material from the solution.

2. A process which comprises removing suspended material from a raw sugar cane juice, passing the juice through an ion exchange purification system, comprising a plurality of pairs of ion exchangers, the first of each pair being a cation exchanger and the other an anion exchanger, thereafter adding about 0.01–0.1% of phosphoric acid to the juice, based on the available $P_2O_5$ and upon the total solids content of the juice, adding lime to bring the pH to about 6–8 and removing precipitated and coagulated material from said juice.

3. A process which comprises removing suspended material from a raw sugar cane juice, passing the juice through an ion exchange purification system, comprising a plurality of pairs of ion exchangers, the first of each pair being a cation exchanger and the other an anion exchanger, thereafter adding about 0.01–0.1% of phosphoric acid to the juice, based on the available $P_2O_5$ and upon the total solids content of the juice, adding lime to bring the pH to about 6–8, removing precipitated and coagulated material from said juice, concentrating the juice to a syrup of at least 50 Brix and treating said syrup with a small proportion of activated carbon.

4. A process which comprises removing suspended material from a raw sugar cane juice, passing the juice through an ion exchange purification system, comprising a plurality of pairs of ion exchangers, the first ion exchanger of each pair being a cation exchanger and the other being an anion exchanger, concentrating the juice to at least 50 Brix, adding 0.01–0.1% of phosphoric acid, calculated as available $P_2O_5$ and based upon the solids content of the syrup, thereafter adding lime to bring the pH to about 6–8 and removing the coagulated and precipitated material from said syrup.

5. A process which comprises separating suspended material from a raw sugar juice, passing said juice through an ion exchanger purification system having ion exchangers arranged in series, comprising first an anion exchanger and at least two, but not more than four, pairs of ion exchangers, the first of each pair being a cation exchanger and the other being an anion exchanger, treating the effluent from said system with about 0.01–0.1% of phosphoric acid based on the available $P_2O_5$ and the total solids in the effluent, thereafter neutralizing the phosphoric acid with lime to bring the pH of the liquid to about 6–8 and thereafter removing suspended and precipitated matter from the liquid.

6. A process which comprises treating a sugar juice with a plurality of pairs of ion exchangers, the first of each pair being a cation exchanger and the other being an anion exchanger, to remove at least 50% of the non-sugar solids, thereafter adding 0.01–0.1% of phosphoric acid, calculated as $P_2O_5$ and based upon the total solids in the solution, and sufficient lime to adjust the pH at about 6–8 and removing the coagulated and precipitated solids from said solution.

FRED L. GAYLE.

REFERENCES CITED

The following references are of record in the file of this patent:

UNITED STATES PATENTS

| Number | Name | Date |
|---|---|---|
| 240,879 | Behr et al. | May 3, 1881 |
| 1,317,607 | Williamson | Sept. 30, 1919 |
| 2,388,194 | Vallez | Oct. 30, 1945 |
| 2,402,960 | Gustafson | July 2, 1946 |
| 2,403,177 | Gustafson | July 2, 1946 |

OTHER REFERENCES

Halvorsen et al.: "Defecation of Refinery Syrups," Int. Sugar Jour., Oct. 1946, pages 264 and 265.

Cummins: "Calcium Phosphate in the Filtration of Sugar Liquors," Ind. and Eng. Chem., Apr. 1942, pages 398–402.

Frankenhoff: "Pressure Filtration of Phosphoric Acid and Lime-Defecated Refinery and Whole Raw Sugar Liquors," Ind. and Eng. Chem., June 1942, pages 742–744.